United States Patent
Saito et al.

(10) Patent No.: US 8,069,518 B2
(45) Date of Patent: Dec. 6, 2011

(54) BOARDING BRIDGE, BOARDING BRIDGE SYSTEM, AND METHOD FOR MOUNTING THE BOARDING BRIDGE

(75) Inventors: Yuji Saito, Tokyo (JP); Takahiro Yoshimoto, Hyogo (JP)

(73) Assignee: Shinmaywa Industries, Ltd., Hyogo (JP)

(*) Notice: Subject to any disclaimer, the term of this patent is extended or adjusted under 35 U.S.C. 154(b) by 399 days.

(21) Appl. No.: 12/323,547

(22) Filed: Nov. 26, 2008

(65) Prior Publication Data

US 2009/0139039 A1   Jun. 4, 2009

(30) Foreign Application Priority Data

Nov. 30, 2007 (JP) ................... 2007-309598

(51) Int. Cl.
*E01D 1/00* (2006.01)
(52) U.S. Cl. ........................................... 14/71.5
(58) Field of Classification Search ............... 14/71.5
See application file for complete search history.

(56) References Cited

U.S. PATENT DOCUMENTS

| | | | | |
|---|---|---|---|---|
| 2,875,457 A | * | 3/1959 | Read et al. | 14/71.5 |
| 3,404,417 A | * | 10/1968 | Wollard et al. | 14/71.5 |
| 3,412,412 A | * | 11/1968 | Kjerulf et al. | 14/71.5 |
| 3,538,529 A | * | 11/1970 | Breier | 14/71.5 |
| 3,683,440 A | * | 8/1972 | Xenakis et al. | 14/71.5 |
| 3,808,626 A | * | 5/1974 | Magill | 14/71.5 |
| 3,883,918 A | * | 5/1975 | Magill | 14/71.5 |
| 4,553,720 A | | 11/1985 | Harder | |
| 5,761,757 A | * | 6/1998 | Mitchell et al. | 14/71.5 |
| 6,122,789 A | | 9/2000 | Stephenson et al. | |
| 6,487,743 B1 | * | 12/2002 | Nicoletti | 14/71.5 |
| 6,684,443 B2 | * | 2/2004 | Thomas et al. | 14/71.5 |
| 6,691,361 B2 | * | 2/2004 | Rolfe et al. | 14/71.5 |
| 6,898,816 B2 | * | 5/2005 | Tholen et al. | 14/71.5 |
| 6,929,217 B2 | * | 8/2005 | Greaves et al. | 244/114 R |
| 7,069,612 B1 | | 7/2006 | Anderberg | |
| 2002/0100128 A1 | | 8/2002 | Tholen et al. | |
| 2002/0138924 A1 | | 10/2002 | Rolfe et al. | |
| 2002/0174497 A1 | | 11/2002 | Rolfe et al. | |
| 2003/0074749 A1 | | 4/2003 | Smith | |
| 2007/0219710 A1 | | 9/2007 | Hutton | |

FOREIGN PATENT DOCUMENTS

| | | |
|---|---|---|
| JP | 46-13862 B | 4/1971 |
| JP | 03-072911 U | 7/1991 |
| JP | 10-505562 A | 6/1998 |
| JP | 2002-37196 A | 2/2002 |
| JP | 2007-030677 A | 8/2007 |

OTHER PUBLICATIONS

Official Communication issued in corresponding Japanese Patent Application No. 2007-309598, mailed on Sep. 26, 2011.

* cited by examiner

*Primary Examiner* — Gary S Hartmann
(74) *Attorney, Agent, or Firm* — Keating & Bennett, LLP (57) ABSTRACT

A boarding bridge includes a rotunda connected to a terminal building and rotatable around a vertical axis thereof; an extendable tunnel section connected to the rotunda at one end thereof; and a cab connected to the other end of the tunnel section and rotatable around a vertical axis thereof. The tunnel section is structured to extend generally parallel to a fuselage of an aircraft when the cab is attached to the aircraft. The cab includes a floor extending in a direction generally perpendicular to the tunnel section, and a gangplank which is arranged to be projectable forward from a portion of the floor, and by projecting forward, defines a path connecting the floor and a hatch of the aircraft.

6 Claims, 8 Drawing Sheets

BOARDING BRIDGE, BOARDING BRIDGE SYSTEM, AND METHOD FOR MOUNTING THE BOARDING BRIDGE

BACKGROUND OF THE INVENTION

1. Field of the Invention

The present invention relates to a boarding bridge, specifically to a boarding bridge attachable to an aircraft having a built-in airstair. The present invention also relates to a boarding bridge system including such a boarding bridge, and a method for attaching such a boarding bridge.

2. Description of the Related Art

Conventionally, a boarding bridge is known as boarding/disembarking equipment for aircrafts. The boarding bridge includes a passageway for connecting a terminal building of an airport and an aircraft. Use of the boarding bridge allows passengers or the like to move between the aircraft and the terminal building for boarding or disembarkation (see, for example, Japanese Laid-Open Patent Publication No. 2002-37196).

A boarding bridge disclosed in Japanese Laid-Open Patent Publication No. 2002-37196 includes a rotunda connected to the terminal building, an extendable tunnel section connected to the rotunda, and a cab provided at a tip of the tunnel section.

Figure 8:
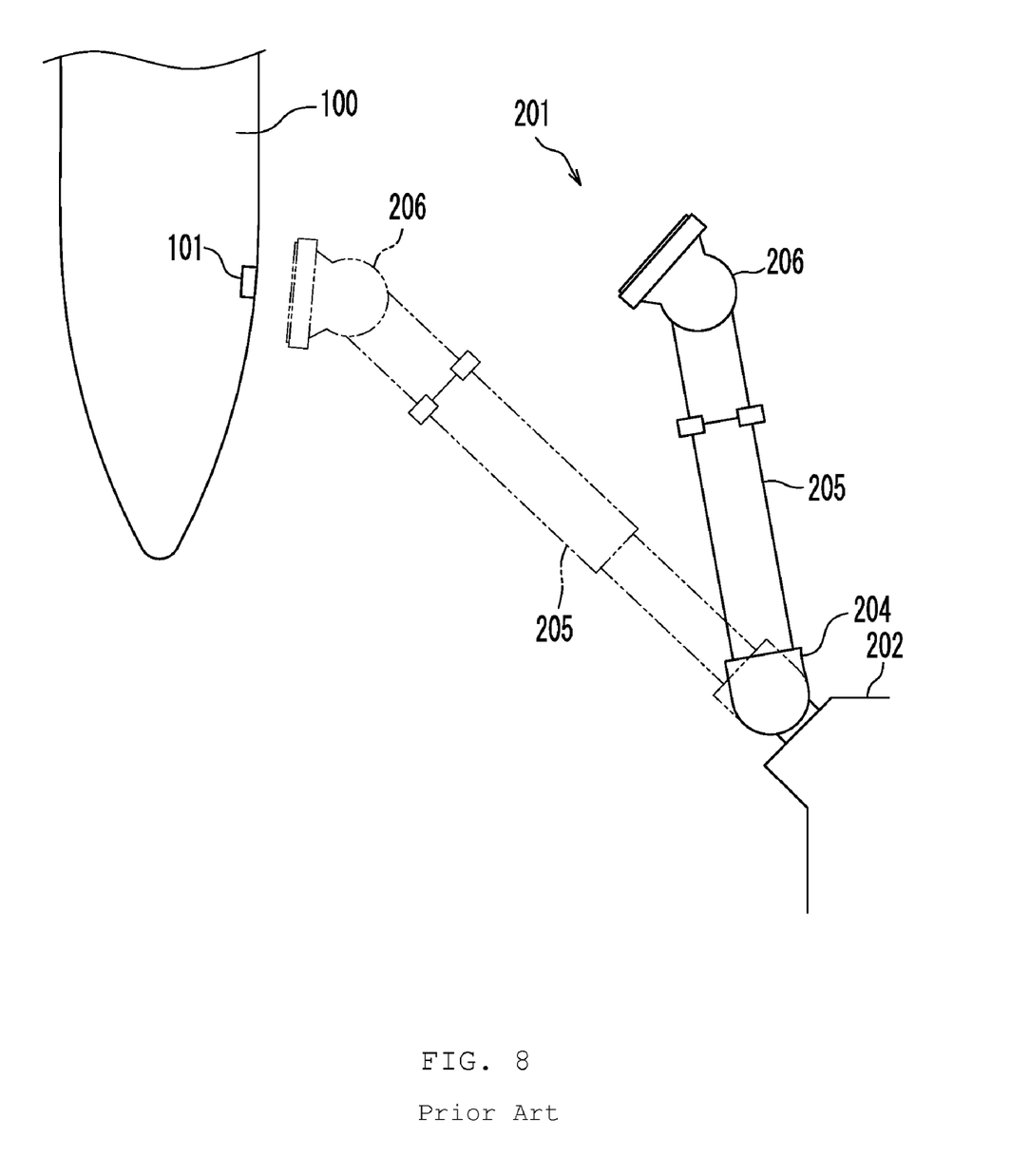
FIG. 8 is a plan view of a conventional boarding bridge.

With reference to FIG. 8, a method for attaching such a boarding bridge to an aircraft will be described. When an aircraft 100 parks at a predetermined position of an apron, an operator in a cab 206 of a boarding bridge 201 drives the cab 206 toward a door 101 of the aircraft 100. At this point, a rotunda 204 pivots and the tunnel section 205 extends. The cab 206 also pivots with respect to the tunnel section 205. Reference numeral 202 represents a terminal building. When the cab 206 reaches a position facing the door 101, the cab 206 is advanced toward the door 101 and attached so as to surround the door 101. Then, the door 101 is opened, and the passengers can board or disembark. Although not shown, the door 101 is rotatable or slidable horizontally.

For example, some of so-called small aircrafts have an airstair (a boarding/disembarking stairway which is provided on a rear surface of the door and becomes usable when the door is opened outside). In this type of aircraft, the door pivots upward or downward with a bottom end thereof being used as the support. Therefore, once the cab is attached so as to surround the door, the door interferes with the floor of the cab and cannot be opened.

Some of the so-called small aircraft shave a short distance between a hatch and an engine. A boarding bridge having a conventional structure cannot be attached easily to this type of aircraft. Even if the boarding bridge can be attached, care must be taken to make sure that the cab does not interfere with the engine during the operation of attaching the boarding bridge so as to surround the hatch. Thus, there is a problem that the load on the operator is heavier than for attaching the boarding bridge to large aircrafts.

An unrecognized and unmet need is that a small aircraft allows elderly people and handicapped people to board easily with less load at the time of boarding. Therefore, use of a boarding bridge is desired even for small aircrafts.

SUMMARY OF THE INVENTION

In light of the above problems, preferred embodiments of the present invention provide a boarding bridge attachable even to an aircraft having a built-in airstair and having a short distance between the hatch and the engine without imposing a significant load. In addition, preferred embodiments of the present invention provide a boarding bridge which allows passengers or the like to move between any small aircraft and a terminal building for boarding and disembarkation.

A boarding bridge according to a preferred embodiment of the present invention includes a rotunda connected to a terminal building and rotatable around a vertical axis thereof; an extendable tunnel section connected to the rotunda at one end thereof; and a cab connected to the other end of the tunnel section and rotatable around a vertical axis thereof. The tunnel section is structured to extend generally parallel to a fuselage of an aircraft when the cab is attached to the aircraft. The cab includes a floor extending in a direction generally perpendicular to the tunnel section, and a gangplank which is arranged to be projectable forward from a portion of the floor, and by projecting forward, defines a path connecting the floor and a hatch of the aircraft.

A method for attaching a boarding bridge method includes a first step of pivoting the rotunda until the tunnel section becomes generally parallel to the fuselage of the aircraft; a second step of extending or contracting the tunnel section until a position of a tip of the cab reaches a position facing the hatch of the aircraft; a third step of causing the cab to approach the hatch; and a fourth step of causing the gangplank to project forward from the floor, thereby bridging a gap between the floor and the hatch by the gangplank.

The above-described boarding bridge includes the gangplank projectable forward from a portion of the cab. Therefore, after the door of the aircraft is opened, the cab is attached to the aircraft and the gangplank is projected forward, so that a path connecting the floor of the cab and the hatch of the aircraft is formed. Thus, the passengers can board or disembark from the aircraft. Hence, the boarding bridge is attachable even to an aircraft having a built-in airstair.

In the above-described boarding bridge, the cab includes a floor extending in a direction generally perpendicular to the tunnel section. Therefore, the position of the tip of the cab can be matched to the position of the hatch of the aircraft merely by pivoting the rotunda until the tunnel section is generally parallel to the fuselage of the aircraft and then extending or contracting the tunnel section. In the case of an aircraft having a short distance between the hatch and the engine, the tunnel section extends in a direction of approaching the engine along the fuselage of the aircraft. Therefore, unlike the case where the cab passes by the engine while pivoting around the rotunda acting as the pivoting center, the operator can easily see how close the cab is to the engine. Therefore, the interference between the cab and the engine can be easily avoided, and the load on the operator is alleviated.

The floor of the cab may include a projecting floor projecting forward and a retracted floor retracted rearward with respect to the projecting floor; and the gangplank may project forward from the retracted floor.

As a result of this unique structure and method, the interference between the airstair and the floor of the cab can be avoided by positioning the retracted floor rearward to the airstair when attaching the boarding bridge to the aircraft. The orientation of the cab can be accurately matched to the hatch of the aircraft by putting the tip side of the projecting floor (it is preferable that a bumper is provided on the tip side of the projecting floor) in contact with or close to the fuselage of the aircraft and placing the projecting floor parallel or substantially parallel to the fuselage of the aircraft. After the cab is accurately positioned in this manner, the gangplank is projected from the retracted floor, so that a path connecting the floor of the cab and the hatch of the aircraft is formed. Hence, the load on the operator for positioning the cab is further alleviated.

Preferably, the boarding bridge further includes a forward/rearward sliding mechanism for sliding the gang plank forward or rearward.

As a result, a path connecting the floor of the cab and the hatch of the aircraft is provided by matching the position of the cab with the position of the hatch of the aircraft and then sliding the gangplank forward toward the hatch of the aircraft.

Preferably, the cab crosses the tunnel section in a T shape as seen in a plan view.

As a result, the cab has a certain amount of length both in the direction toward the hatch of the aircraft (forward) and in a direction opposite thereto (rearward). Therefore, the distance by which the gangplank is slidable forward and rearward can be long. In addition, the gangplank can be slid rearward further beyond the exit of the tunnel section (the intersection of the tunnel section and the cab). For this reason, the distance between the exit of the tunnel section and the tip of the cab can be shortened. Accordingly, as compared with the case where the cab crosses the tunnel section in an L shape as seen in a plan view, the distance between the exit of the tunnel section and the hatch of the aircraft can be shorter. Thus, the distance by which the passengers or the like need to walk can be shortened.

Preferably, the boarding bridge also includes a rightward/leftward sliding mechanism for sliding the gangplank rightward or leftward.

As a result, the position of the gang plank and the position of the hatch of the aircraft can be matched more easily.

Preferably, the boarding bridge further includes a parallel degree detection sensor for detecting whether or not a tip portion of the floor of the cab is parallel to the fuselage of the aircraft.

As a result, the degree of parallel orientation between the tip portion of the floor of the cab and the fuselage of the aircraft can be further improved by adjusting the orientation of the cab based on the detection result of the parallel degree detection sensor. Therefore, the gangplank can be more accurately positioned with respect to the hatch of the aircraft.

A boarding bridge system according to a preferred embodiment of the present invention includes a first boarding bridge defined by the above-described boarding bridge; and a second boarding bridge including a rotunda connected to the terminal building and rotatable around a vertical axis thereof, an extendable tunnel section connected to the rotunda at one end thereof, and a cab connected to the other end of the tunnel section and rotatable around a vertical axis thereof. The first boarding bridge and the second boarding bridge are located in the same area of an airport.

According to the above-described boarding bridge system, for example, the first boarding bridge can be used for a small aircraft having an airstair, whereas the second boarding bridge can be used for a large aircraft having a door rotatable or slidable in the horizontal direction. Thus, both of the small aircraft and the large aircraft can be selectively parked in the same spot.

As described above, according to a preferred embodiment of the present invention, a boarding bridge attachable even to an aircraft having a built-in airstair and having a short distance between the hatch and the engine without imposing any heavy load on an operator can be realized. Since the boarding bridge according to a preferred embodiment of the present invention has a structure attachable to any small aircraft, the passengers or the like can board or disembark from any small aircraft.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Overall Structure of Boarding Bridge

Figure 1:
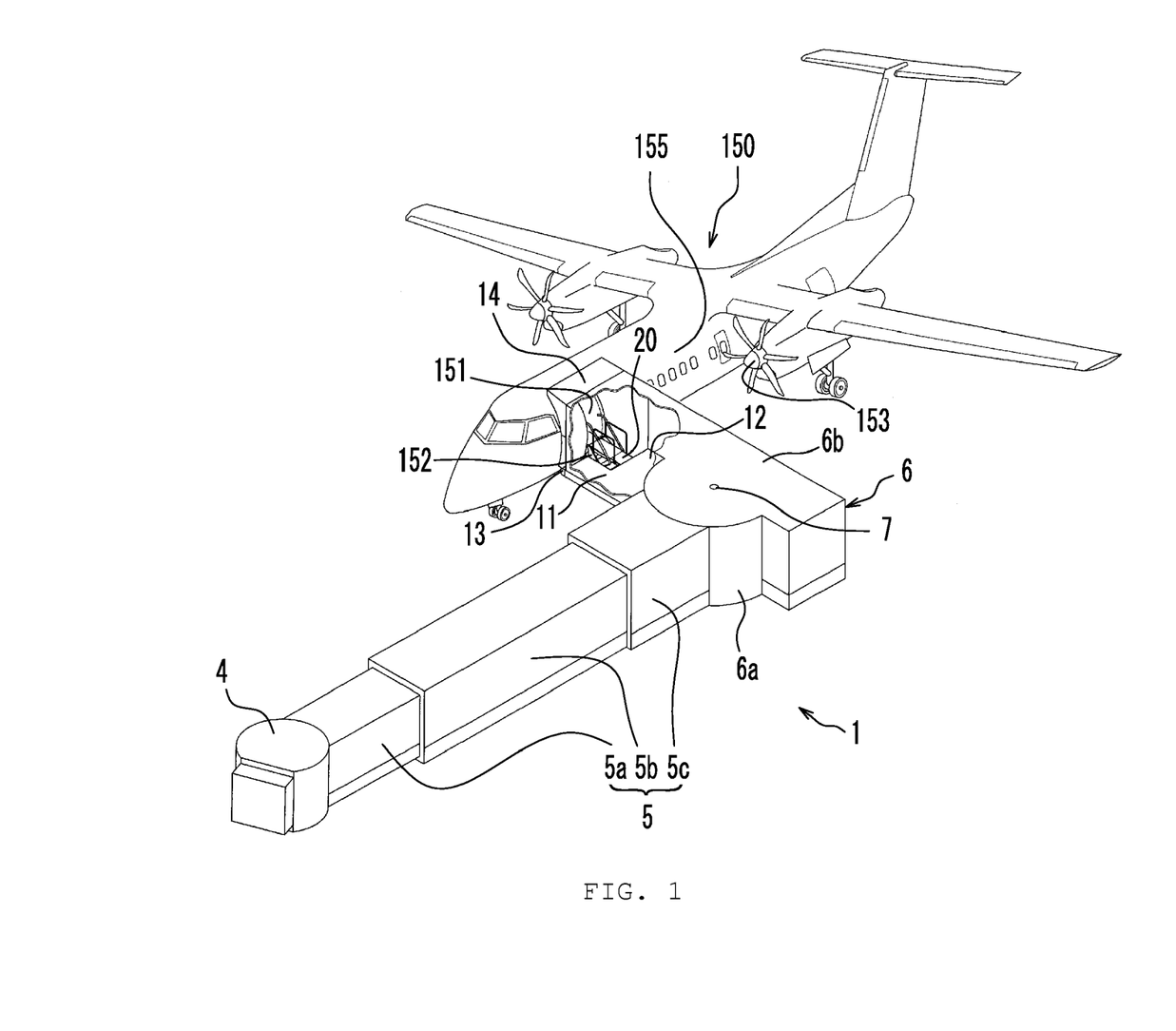
FIG. 1 is an isometric view showing a state in which a boarding bridge is attached.

As shown in FIG. 1, a boarding bridge 1 according to this preferred embodiment is attachable to a small aircraft 150 including an airstair 152. The boarding bridge 1 is also attachable to the aircraft 150 having a short distance between a hatch 151 and an engine 153.

As shown in FIG. 1, the boarding bridge 1 includes a rotunda 4 connected to a terminal building of an airport, a tunnel section 5 connected to the rotunda 4, and a cab 6 provided on the tip side of the tunnel section 5.

The rotunda 4 is structured to be rotatable around a vertical axis thereof. The tunnel section 5 includes a first tunnel 5a, a second tunnel 5b and a connecting tunnel 5c. The second tunnel 5b is assembled so as to be slidable with respect to the first tunnel 5a, and the connecting tunnel 5c is coupled to the second tunnel 5b. Thus, the tunnel section 5 is extendable. Inside the tunnel section 5, a passageway (not shown) is provided, and the passageway is also extendable. The number of tunnels in the tunnel section is not limited to three, and may be two, or four or greater. Where the entire tunnel section 5 is extendable, there may be one tunnel. Herein, the "tunnel" is not necessarily covered entirely on side and top surfaces thereof, and may be covered on a portion of the side and top surfaces. A tunnel section according to a preferred embodiment of the present invention may be opened on the top.

Structure of Cab

In the boarding bridge 1 according to this preferred embodiment, the cab 6 is not generally circular but is generally rectangular as seen in a plan view. The cab 6 is structured to be rotatable around a vertical axis 7 thereof. The cab 6 includes a semicircular section 6a connected to the connecting tunnel 5c and a linear section 6b extending in a direction generally perpendicular to the tunnel section 5.

In the following description, the open-end side of the cab 6 will be referred to as the "tip" side or the "front" side. In a portion on the front side of the cab 6, a projecting floor 11 projecting forward and a retracted floor 12 retracted rearward with respect to the projecting floor 11 are provided. In this preferred embodiment, the projecting floor 11 and the retracted floor 12 define an L-shaped stepped portion as seen in a plan view on the tip side of the floor of the cab 6. On the tip side of the projecting floor 11, a bumper 13 is attached.

As described later, a gangplank 20 slidable forward and rearward is provided inside or below the retracted floor 12.

The gangplank 20 defines a path connecting the retracted floor 12 and the hatch 151 of the aircraft 150.

On the tip side of the cab 6, a closure 14 which is to surround the hatch 151 of the aircraft 150 is provided. The closure 14 is not indispensable and may be omitted.

Figure 2:
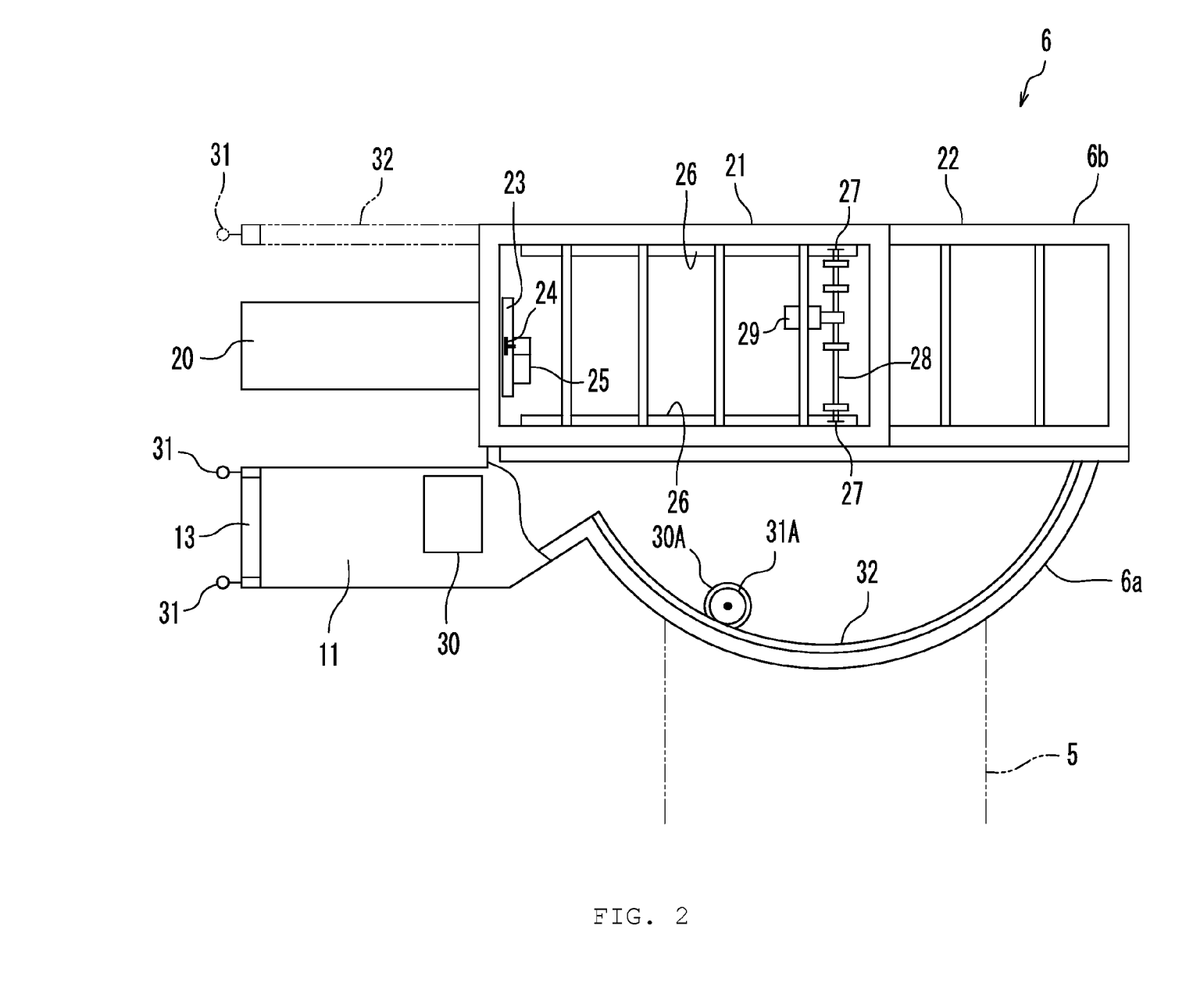
FIG. 2 is a plan view of the inside of a cab.

FIG. 2 is a plan view conceptually showing an internal structure of the cab 6. Below the semicircular section 6a of the cab 6 (i.e., below the floor), a chain 32 is arranged in an arc. Also below the semicircular section 6a of the cab 6, a sprocket 31A engageable with the chain 32 and a motor 30A for rotating the sprocket 31A are provided. When the motor 30A is driven to rotate the sprocket 31A, the sprocket 32A moves on the chain 32A. As a result, the cab 6 rotates around the vertical axis 7 thereof (see FIG. 1). Namely, the cab 6 is driven to rotate by the motor 30A.

Below the linear section 6b of the cab 6 (i.e., below the floor), a slidable table 21 and a support table 22 for supporting the slidable table 21 to be slidable forward and rearward are provided. On the tip side of the slidable table 21 (left in the figure), the gangplank 20 is attached.

In the following description, the directions of front, rear, right and left are represented with respect to a direction from a central portion of the cab 6 toward the gangplank 20. In other words, the directions are represented based on a direction seen from an operator in the cab 6. Hence, left, right, bottom and top in FIG. 2 respectively correspond to front, rear, left and right as seen in such a direction. In a portion on the tip side of the slidable table 21, a chain 23 extendable rightward and leftward is located. Rear to the gangplank 20, a sprocket 24 engageable with the chain 23 and a motor 25 for rotating the sprocket 24 are provided. When the motor 25 is driven to rotate the sprocket 24, the sprocket 24 moves on the chain 23 rightward or leftward. As a result, the gangplank 20 slides rightward or leftward together with the motor 25 and the sprocket 24. Namely, the gang plank 20 is movable rightward and leftward by the motor 25. The motor 25, the sprocket 24 and the chain 23 define a rightward/leftward sliding mechanism for sliding the gangplank 20 rightward or leftward.

On each of the right side and the left side of the support table 22, a chain 26 extendable forward and rearward is located. The slidable table 21 is provided with a sprocket 27 engageable with the chain 26, a driving shaft 28 rotatable together with the sprocket 27, and a motor 29 for rotating the driving shaft 28. When the motor 29 is driven to rotate the driving shaft 28, the sprocket 27 moves on the chain 26 forward or rearward. As a result, the slidable table 21 slides forward or rearward. The gangplank 20 attached to the slidable table 21 also slides forward or rearward. Namely, the gangplank 20 is movable forward and rearward by the motor 29. The motor 29, the driving shaft 28, the sprocket 27 and the chain 26 define a forward/rearward sliding mechanism for sliding the gangplank 20 forward or rearward.

On the tip side of the projecting floor 11, a plurality of sensors 31 for detecting contact to a fuselage 155 of the aircraft 150 are located. In this preferred embodiment, the sensors 31 are preferably located respectively on both of the right side and the left side of the projecting floor 1. The sensors 31 may be located at any other position than on the projecting floor 11. Alternatively, the sensors 31 may be located on the projecting floor 11 and at any other position than on the projecting floor 11. For example, a rod 32 may be provided at a right end of the retracted floor 12 and a sensor 31 may be located at a tip of the rod 32. The rod 32 may be foldable or slidable forward and rearward. As a result of such an arrangement, the rod 32 can be stored inside when the sensor 31 is not used, which prevents the rod 32 from obstructing any operation.

The plurality of sensors 31 may be located along a tip portion of the floor of the cab 6. In other words, the sensors 31 are arranged in a direction perpendicular or substantially perpendicular to a longitudinal direction of the linear section 6b (the right-left direction of FIG. 2) of the cab 6 (i.e., the sensors 31 are arranged in the up-down direction of FIG. 2). These sensors 31 detect whether or not the tip portion of the floor of the cab 6 is parallel to the fuselage 155 of the aircraft 150. In this preferred embodiment, the sensors 31 are preferably contact type sensors, but may be non-contact type sensors (for example, optical sensors, etc.) for measuring a distance between the tip portion of the floor of the cab 6 and the fuselage 155 of the aircraft 150. In this preferred embodiment, as the push distance values detected by the plurality of sensors 31 are closer to each other, the degree of parallel orientation is higher. In the case where non-contact sensors are used, as the distance values detected by the plurality of sensors are closer to each other, the degree of parallel orientation is higher.

In this preferred embodiment, an operation board 30 is located on the projecting floor 11. The operation board 30 is not limited to being located on the projecting floor 11.

Figure 3:
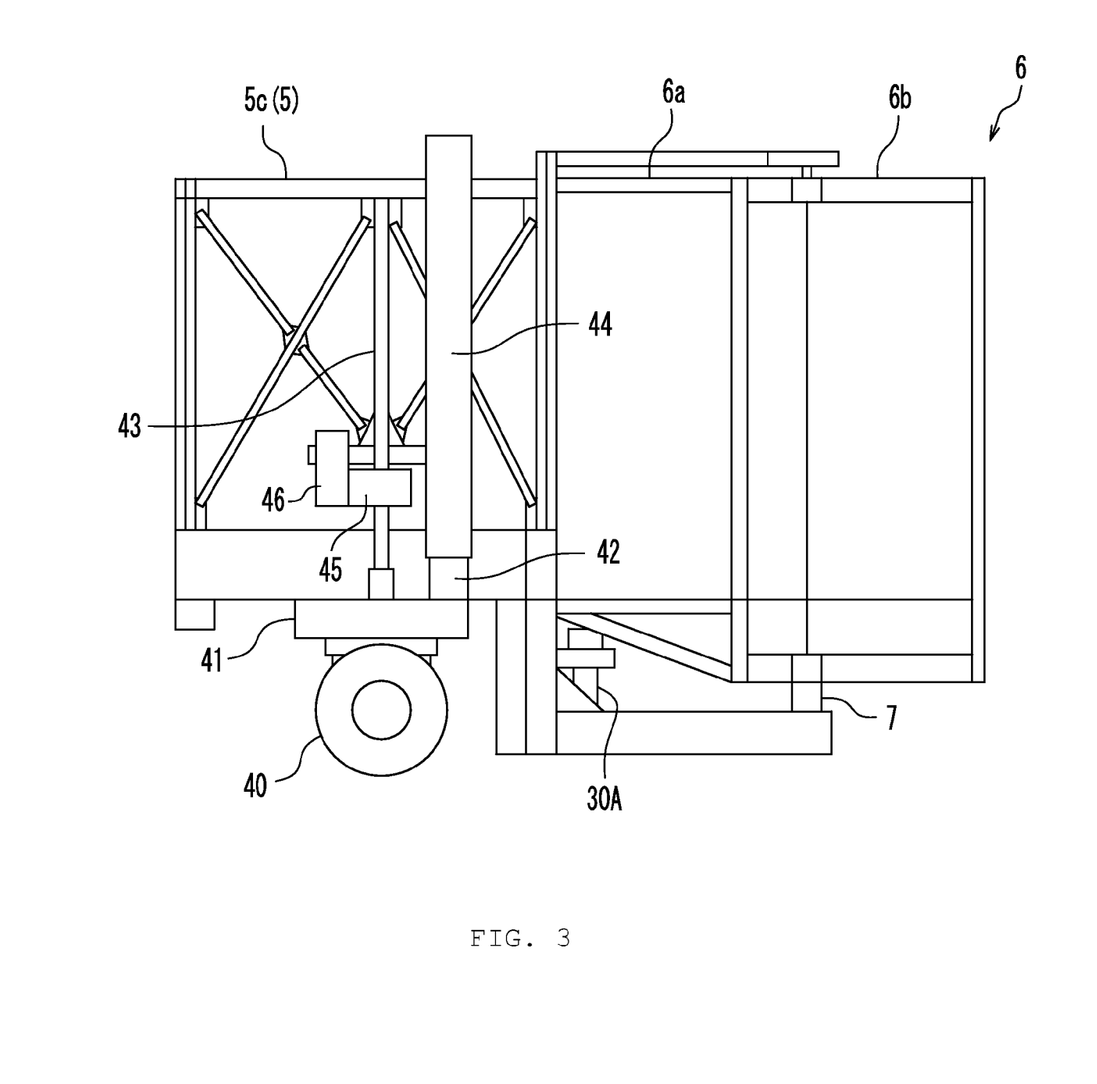
FIG. 3 is a rear view of the cab and a tunnel section.

FIG. 3 shows the cab 6 and a portion of the tunnel section 5 as seen from behind. As shown in FIG. 3, the tunnel section 5 is provided with a pair of right and left running wheels 40 (in FIG. 3, only the right running wheel is shown). On the running wheel 40, a support table 41 is supported.

On the support table 41, a first guide frame 42 extendable upward and downward and a worm 43 extendable upward and downward are supported. Although not shown, the worm 43 has a spiral groove in an outer circumferential surface thereof. A second guide frame 44 extendable upward and downward is fixed to the tunnel section 5. The second guide frame 44 is slidably fit into the first guide frame 42. A worm wheel 45 engaged with the worm 43 and a motor 46 for rotating the worm wheel 45 are fixed to the tunnel section 5. The worm 43 and the worm wheel 45 define a worm gear for moving the worm wheel 45 upward or downward in accordance with the rotation of the worm wheel 45.

When the motor 46 is driven, the worm wheel 45 moves upward or downward along the worm 43. The motor 46 and the worm wheel 45 are attached to the tunnel section 5. Therefore, when the motor 46 is driven, the tunnel section 5 moves upward or downward together with the worm wheel 45. The second guide frame 44 is fixed to the tunnel section 5. Therefore, by the second guide frame 44 being guided by the first guide frame 42, the tunnel section 5 stably moves upward or downward. The cab 6 is attached to the tunnel section 5 to be rotatable around the vertical axis thereof and moves upward or downward together with the tunnel section 5. Therefore, when the motor 46 is driven, the cab 6 also moves upward or downward. By controlling the motor 46, the position of the cab 6 in the up-down direction is adjusted.

Figure 4:
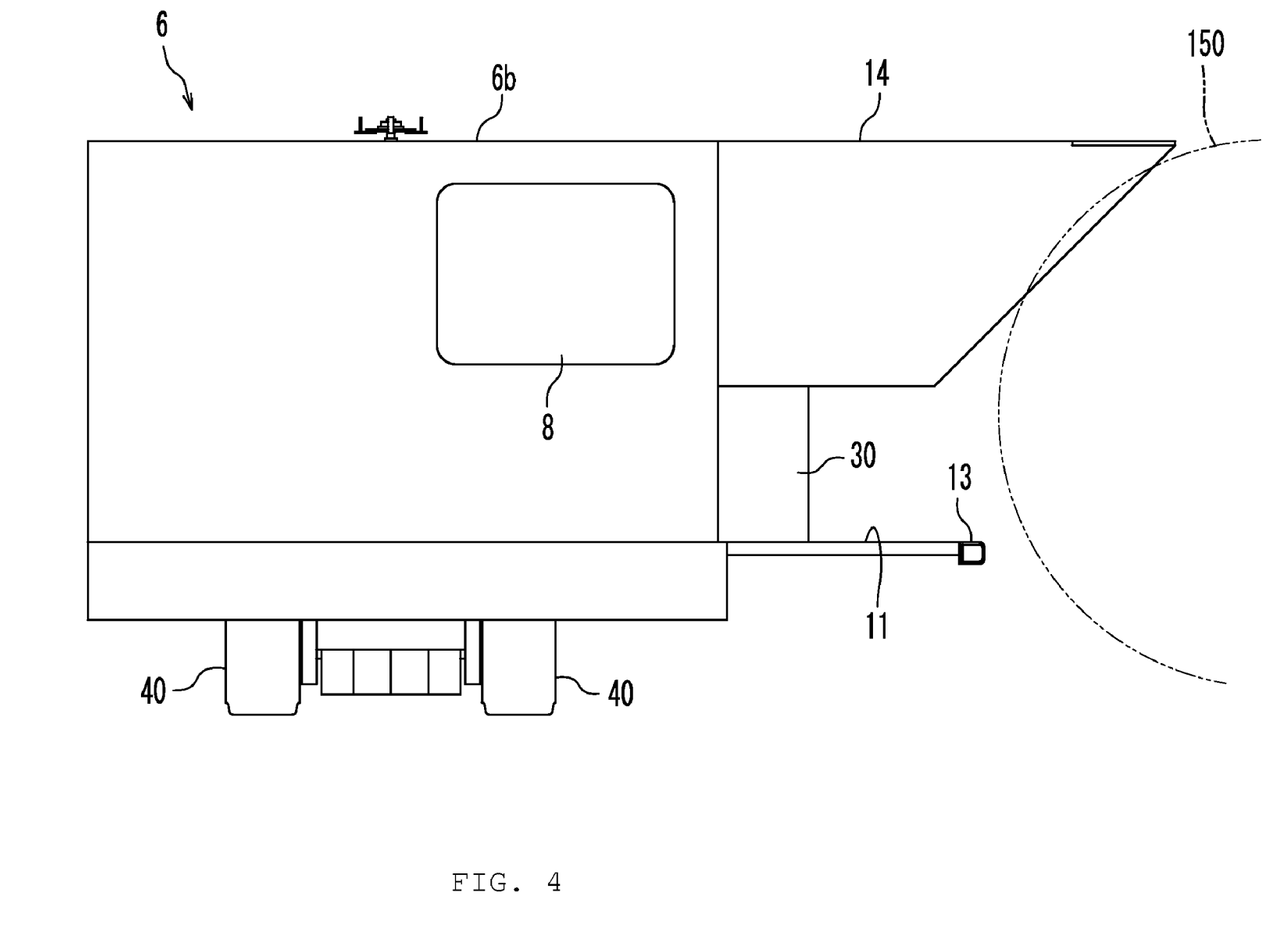
FIG. 4 is a side view of the cab.

FIG. 4 shows the cab 6 as seen from the side. In other words, the cab 6 is seen from outside the boarding bridge 1 in a direction toward the rotunda 4. As shown in FIG. 4, in this preferred embodiment, a window 8 is provided on a right wall of the linear section 6b of the cab 6. In this preferred embodiment, the window 8 has a large size in order to improve the visibility, but there is no specific limitation on the size of the window 8. In the case where a portion of the right wall of the linear section 6b of the cab 6 is opened, the window 8 may be omitted because visibility is guaranteed even without the window 8.

Method for Attaching Boarding Bridge

Now, a method for attaching the boarding bridge 1 will be described.

Figure 5A:
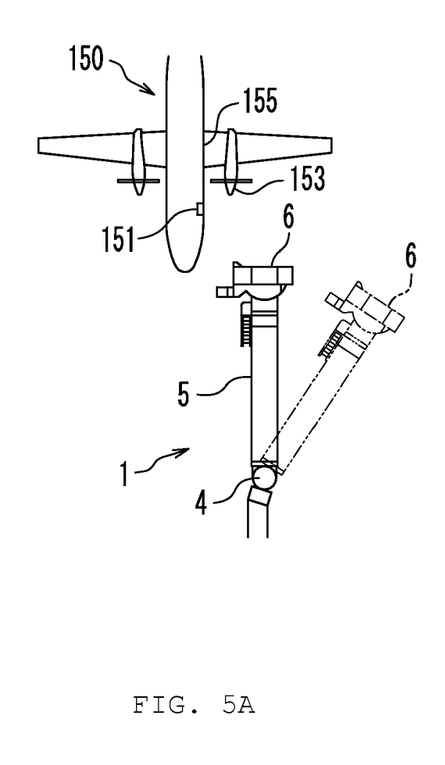
FIGS. 5A through 5C show a method for attaching the boarding bridge.

As shown in FIG. 5A, first, the rotunda 4 is rotated to move the boarding bridge 1 from a wait position (the position represented by the phantom line in FIG. 5A) to a first preparation position. At the first preparation position, the tunnel section 5 is generally parallel to the fuselage 155 of the aircraft 150.

Figure 5B:
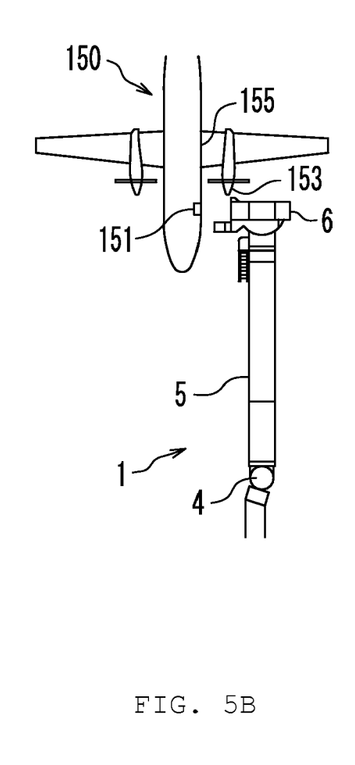

Next, as shown in FIG. 5B, the tunnel section 5 is extended until the tip of the cab 6 comes to a position facing the hatch 151 of the aircraft 150 (i.e., a second preparation position). In more detail, the tunnel section 5 is extended such that the position of the retracted floor 12 of the cab 6 matches the position of the hatch 151. At this point, the extending direction of the tunnel section 5 is generally parallel to the fuselage 155 of the aircraft 150. As described above, the window 8 is preferably provided in the right wall of the cab 6 (see FIG. 4). Therefore, the operator in the cab 6 can easily see the distance between the cab 6 and the engine 153 while moving the cab 6. The cab 6 moves parallel or substantially parallel to the fuselage 155 of the aircraft 150. Therefore, the cab 6 is stopped in front of the hatch 151, and thus the cab 6 is prevented with certainty from being too close to the engine 153.

Figure 6A:
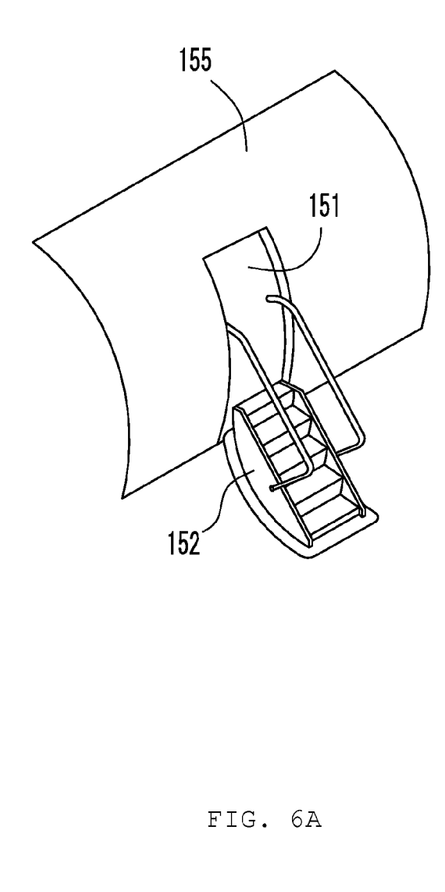
FIGS. 6A through 6C are each an isometric view of an airstair and a floor of the cab.

The airstair 152 may be opened (see FIG. 6A) either while the boarding bridge 1 is at the wait position, while the boarding bridge 1 is moving from the wait position to the first preparation position, while the boarding bridge 1 is at the first preparation position, while the boarding bridge 1 is moving from the first preparation position to the second preparation position, or while the boarding bridge 1 is at the second preparation position.

Figure 5C:
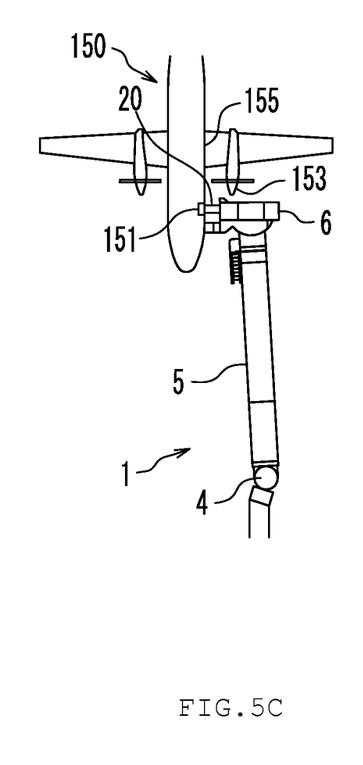
Figure 6B:
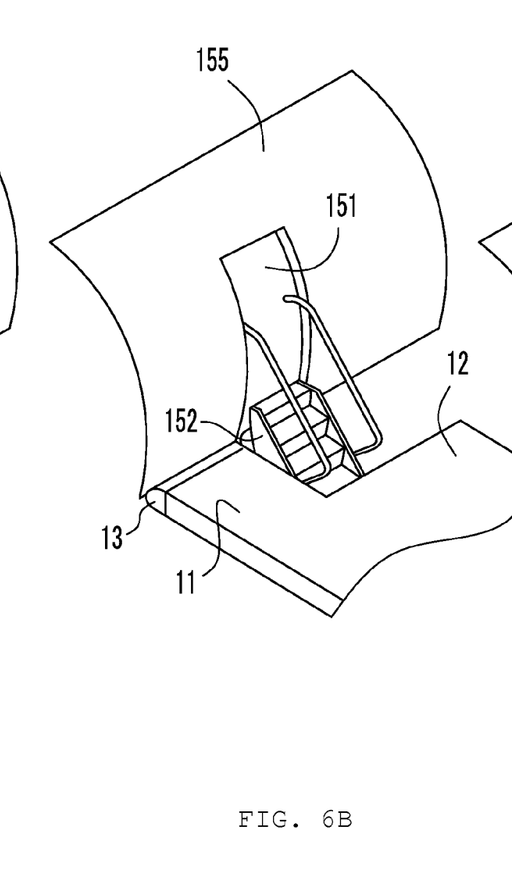

Next, as shown in FIG. 5C, in the state where the airstair 152 is opened (see FIG. 6A), the cab 6 is caused to approach the hatch 151 of the aircraft 150. Specifically, the cab 6 is caused to approach the hatch 151 until the sensors 31 provided at the tip of the cab 6 contact the fuselage 155 of the air craft 150 (see FIG. 6B; in FIGS. 6B and 6C, the sensors 31 are not shown). In this preferred embodiment, the degree of parallel orientation between the tip portion of the cab 6 and the fuselage 155 of the aircraft 150 is detected by the degrees of contact of the plurality of sensors 31. The cab 6 is positioned so as to be substantially parallel to the fuselage 155 of the aircraft 150. Namely, the orientation of the cab 6 is adjusted such that the cab 6 is oriented substantially perpendicular to the fuselage 155 of the aircraft 150, in other words, such that the longitudinal direction of the linear section 6b of the cab 6 is substantially perpendicular to the longitudinal direction of the fuselage 155 of the aircraft 150.

Next, the gangplank 20 is slid forward to bridge the gap between the retracted floor 12 and the hatch 151. Specifically, first, the motor 25 (see FIG. 2) is controlled to move the gangplank 20 rightward or leftward such that the position of the gangplank 20 in the right-left direction matches the position of the hatch 151 in the right-left direction. After confirming that the position of the gangplank 20 in the right-left direction matches the position of the hatch 151 in the right-left direction, the motor 29 is controlled to advance the slidable table 21. Thus, the gangplank 20 moves forward and defines a path between the retracted floor 12 and the hatch 151 (see FIG. 6C).

Figure 6C:
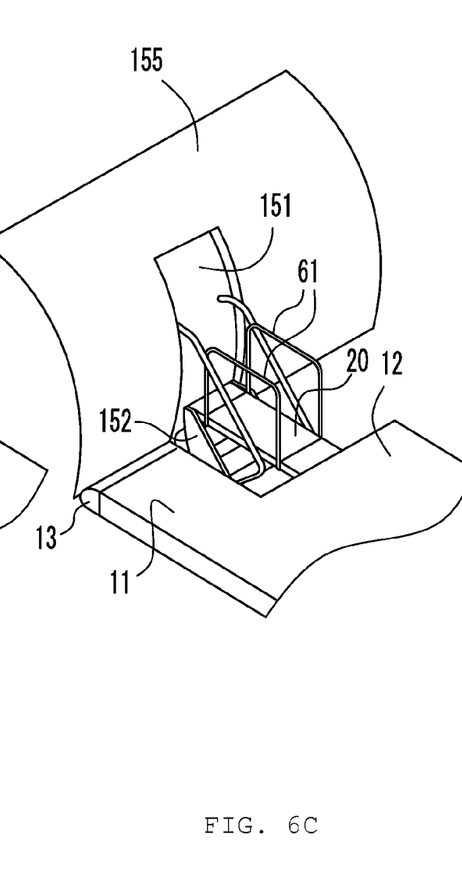

In FIG. 6C (also in FIG. 1), guiderails 61 are provided on the right side and the left side of the gangplank 20, but the guiderails 61 may be omitted. The guiderails 61 may be fit into the gangplank 20 after the gangplank 20 is projected from the retracted floor 12. The guiderails 61 may be structured so as to be accommodated in a right side portion and a left side portion of the gangplank 20 and may be taken out after the gangplank 20 is projected from the retracted floor 12.

Function and Effects of the Present Preferred Embodiment

As described above, the boarding bridge 1 according to this preferred embodiment includes the gang plank 20 which is arranged to be projectable forward from a portion of the floor of the cab 6 and connects the floor of the cab 6 and the hatch 151 of the aircraft 150. Therefore, after the airstair 152 is opened, the gap between the cab 6 and the hatch 151 is bridged by the gangplank 20, so that the passengers or the like can move between the cab 6 and the aircraft 150 for boarding or disembarkation. Hence, the boarding bridge 1 according to this preferred embodiment is attachable even to the aircraft 150 having the built-in airstair 152.

In the boarding bridge 1, the cab 6 includes the linear section 6b extending in a direction generally perpendicular to the tunnel section 5. Herein, the "generally perpendicular direction" encompasses a direction slightly inclined to the perpendicular direction. For example, a direction inclined to the perpendicular direction by about −10 to +10 degrees is encompassed in the "generally perpendicular direction". With the boarding bridge 1, the position of the tip of the cab 6 can be matched to the position of the hatch 151 of the aircraft 150 merely by pivoting the rotunda 4 until the tunnel section 5 is generally parallel to the fuselage 155 of the aircraft 150 and then extending the tunnel section 5. At this point, the cab 6 advances in a direction of linearly approaching the engine 153 of the aircraft 150. Therefore, unlike the case where the cab passes by the engine while pivoting around the rotunda acting as the pivoting center, the operator can easily see how close the cab 6 is to the engine 153. In addition, the movement of the cab 6 is stopped at the point when the tip of the cab 6 reaches a position in front of the hatch 151 of the aircraft 150. Therefore, the cab 6 can be naturally prevented from being too close to the engine 153, and the operator does not need to watch how close the cab 6 is to the engine 153 as much as required by the conventional art. Accordingly, even where the aircraft 150 has a short distance between the hatch 151 and the engine 153, the interference between the hatch 151 and the engine 153 can be easily avoided, which alleviates the load on the operator.

According to this preferred embodiment, the gangplank 20 is slidable rightward and leftward. Therefore, after the position of the cab 6 is matched to the position of the hatch 151 of the aircraft 150, the gangplank 20 is moved rightward or leftward, so that the position of the gangplank 20 in the right-left direction can be finely and accurately adjusted to be matched to the position of the hatch 151 in the right-left direction.

According to this preferred embodiment, the gangplank 20 is slidable forward and rearward. Therefore, after the position of the cab 6 is matched to the position of the hatch 151 of the aircraft 150, the gangplank 20 is slid forward toward the hatch 151, so that a path connecting the floor of the cab 6 and the hatch 151 can be formed.

According to this preferred embodiment, the cab 6 includes the semicircular section 6a and the linear section 6b, and is attached to the tunnel section 5 in a T shape as seen in a plan view. Thus, the cab 6 has a certain amount of length both in the direction toward the hatch 151 (forward) and in the opposite direction (rearward). Therefore, the slidable distance of the gangplank 20, which is slidably accommodated inside or below the floor of the cab 6, can be long. Hence, the length of the gangplank 20 can also be long.

The gangplank 20 can be slid rearward further beyond the exit of the tunnel section 5 (the intersection of the tunnel section 5 and the cab 6; a tip portion of the connecting tunnel 5c in FIG. 1). For this reason, and because the cab 6 crosses the tunnel section 5 in a T shape as seen in a plan view, the distance between the exit of the tunnel section 5 and the tip of the cab 6 can be shorter than in the case where the cab 6 crosses the exit of the tunnel section 5 in an L shape as seen in a plan view (not shown). Accordingly, the distance by which the passengers or the like need to walk from the exit of the tunnel section 5 to the hatch 151 can be shortened.

Unlike in the above-described preferred embodiment, the cab 6 may be attached to the tunnel section 5 in an L shape as seen in a plan view.

According to this preferred embodiment, the cab 6 includes the projecting floor 11 projecting forward and the retracted floor 12 retracted rearward with respect to the projecting floor 11. The gangplank 20 is structured to project from the retracted floor 12. Therefore, before the gap between the floor of the cab 6 and the hatch 151 is bridged by the gangplank 20, the projecting floor 11 is positioned generally parallel to the fuselage 155 of the aircraft 150, so that the cab 6 can be positioned. Hence, the load on the operator for positioning the cab 6 can be alleviated.

According to this preferred embodiment, the sensors 31 are provided for detecting whether or not the tip portion of the cab 6 is parallel to the fuselage of the aircraft 150. Therefore, before the gangplank 20 is advanced toward the hatch 151, the orientation of the cab 6 can be accurately adjusted to the hatch 151. Hence, the gangplank 20 can be extended straight accurately toward the hatch 151.

Mechanisms in the above-described preferred embodiments (the rightward/leftward sliding mechanism, the forward/rearward sliding mechanism, the driving mechanism for pivoting the cab 6, the mechanism for driving the cab 6 upward or downward, etc.) are not limited to those described above. For example, as each driving mechanism, a rack-pinion driving mechanism, a power cylinder driving mechanism or the like is also usable.

Boarding Bridge System

The boarding bridge 1 is also usable together with a conventional boarding bridge including a cab which is circular as seen in a plan view. A boarding bridge system described below includes the boarding bridge 1 and a conventional boarding bridge provided at the same spot of an airport.

Figure 7A:
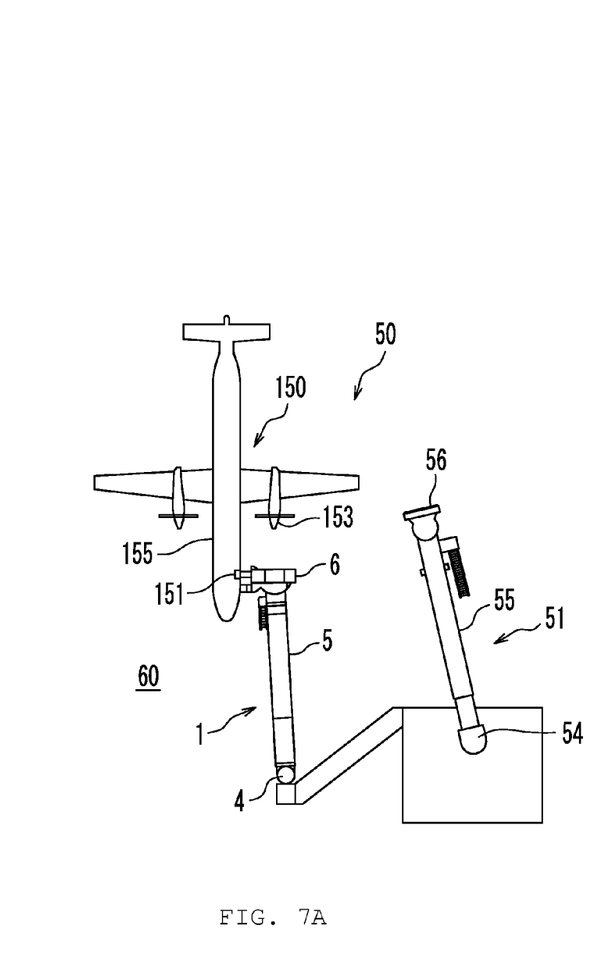
FIGS. 7A and 7B are each a plan view of a boarding bridge system.
Figure 7B:
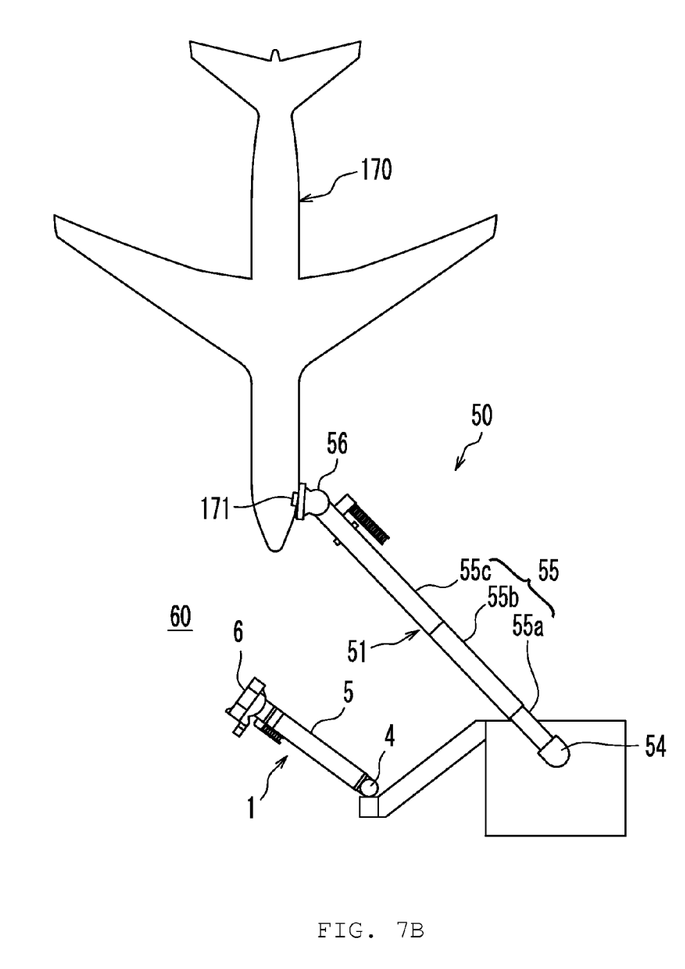

As shown in FIGS. 7A and 7B, a boarding bridge system 50 includes a first boarding bridge 1 and a second boarding bridge 51. The first boarding bridge 1 is preferably defined by the above-described boarding bridge 1. The second boarding bridge 51 includes a rotunda 54, a tunnel section 55 connected to the rotunda 54, and a cab 56 provided on the tip side of the tunnel section 55. The tunnel section 55 includes a first tunnel 55a, a second tunnel 55b and a third tunnel 55c. The first tunnel 55a, the second tunnel 55b and the third tunnel 55c are slidable to make the tunnel section 55 extendable.

The cab 56 is preferably generally circular as seen in a plan view. Unlike the cab 6 of the first boarding bridge 1, the cab 56 of the second boarding bridge 51 does not include the linear section 6b. The floor of the second boarding bridge 51 does not include the projecting floor 11 or the retracted floor 12. On the tip side of the floor of the cab 56, no stepped portion is provided. The cab 56 does not include the gangplank 20.

The first boarding bridge 1 and the second boarding bridge 51 are located at the same spot 60. The first boarding bridge 1 is for a small aircraft 150, and the second boarding bridge 55 is for a large aircraft 170. The small aircraft 150 may have a built-in airstair. The large aircraft 170 has a door rotatable or slidable in the horizontal direction.

As shown in FIG. 7A, when the small aircraft 150 parks in the spot 60, the second boarding bridge 51 is retracted to the wait position, and the first boarding bridge 1 is used. The method for attaching the first boarding bridge 1 to the aircraft 150 is as described above.

As shown in FIG. 7B, when the large aircraft 170 parks in the spot 60, the first boarding bridge 1 is pivoted leftward from an attaching position (the position at which the tunnel section 5 is generally parallel to the fuselage 155 of the aircraft 150) to be located at the retracted position. In this state, the second boarding bridge 51 is moved from the retracted position (the position shown in FIG. 7A) to the attaching position (the position shown in FIG. 7B). The second boarding bridge 51 is attached to the aircraft 170 by moving the cab 56 located at the wait position generally linearly toward a hatch 171 of the aircraft 170.

The boarding bridge system 50 includes the first boarding bridge 1 and the second boarding bridge 51 in the same spot 60, and allows the first boarding bridge 1 or the second boarding bridge 51 to be used selectively. When the first boarding bridge 1 is used, the second boarding bridge 51 is made to wait at the wait position, so that the interference between the first boarding bridge 1 and the second boarding bridge 51 can be avoided. When the second boarding bridge 51 is used, the first boarding bridge 1 is made to wait at the wait position, so that the interference between the first boarding bridge 1 and the second boarding bridge 51 can be avoided. According to the boarding bridge system 50, the small aircraft 150 having a built-in airstair and the large aircraft 170 with no built-in airstair can be selectively parked in the same spot. Therefore, the spot 60 can be efficiently used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A boarding bridge, comprising:
a rotunda connected to a terminal building and rotatable around a vertical axis thereof;
an extendable tunnel section connected to the rotunda at one end thereof; and
a cab connected to the other end of the tunnel section and rotatable around a vertical axis thereof; wherein
the tunnel section is structured to extend generally parallel to a fuselage of an aircraft when the cab is attached to the aircraft; and
the cab includes a floor extending in a direction generally perpendicular to the tunnel section, a gangplank which is arranged to be projectable forward from a portion of the floor, and by projecting forward, defines a path connecting the floor and a hatch of the aircraft, a slidable table to which the gangplank is attached, and a support table supporting the slidable table so as to be slidable forward toward the aircraft and rearward away from the aircraft;
the boarding bridge further comprises a forward/reverse sliding mechanism arranged to slide the gangplank forward and rearward by sliding the slidable table forward and rearward; and
the cab is configured to cross the tunnel section in a T shape as seen in plan view such that a front end portion of the gangplank is located on a first side of the tunnel section and a rear end of the portion of the support table is located on a second side of the tunnel section opposite to the first side of the tunnel section.

2. A boarding bridge according to claim 1, wherein:
the floor of the cab includes a projecting floor projecting forward and a retracted floor retracted rearward with respect to the projecting floor; and
the gangplank is arranged to project forward from the retracted floor.

3. A boarding bridge according to claim 1, further comprising a rightward/leftward sliding mechanism arranged to slide the gangplank rightward or leftward.

4. A boarding bridge according to claim 1, further comprising a parallel degree detection sensor arranged to detect whether or not a tip portion of the floor of the cab is parallel to the fuselage of the aircraft.

5. A boarding bridge system, comprising:
a first boarding bridge defined by the boarding bridge according to claim 1; and
a second boarding bridge including a rotunda connected to the terminal building and rotatable around a vertical axis thereof, an extendable tunnel section connected to the rotunda at one end thereof, and a cab connected to the other end of the tunnel section and rotatable around a vertical axis thereof; wherein
the first boarding bridge and the second boarding bridge are located in the same area of an airport.

6. A method for attaching a boarding bridge to an aircraft, the boarding bridge including:
a rotunda connected to a terminal building and rotatable around a vertical axis thereof;
an extendable tunnel section connected to the rotunda at one end thereof; and
a cab connected to the other end of the tunnel section and rotatable around a vertical axis thereof; wherein
the tunnel section is structured to extend generally parallel to a fuselage of the aircraft when the cab is attached to the aircraft; and
the cab includes a floor extendable in a direction generally perpendicular to the tunnel section, and a gangplank which is arranged to be projectable forward from a portion of the floor, and by projecting forward, defines a path connecting the floor and a hatch of the aircraft;
the method comprising:
a first step of pivoting the rotunda until the tunnel section becomes generally parallel to the fuselage of the aircraft;
a second step of extending or contracting the tunnel section until a position of a tip of the cab reaches a position facing the hatch of the aircraft;
a third step of causing the cab to approach the hatch; and
a fourth step of causing the gangplank to project forward from the floor, thereby bridging a gap between the floor and the hatch by the gangplank.

* * * * *